US012783964B2

(12) United States Patent
Sohn et al.

(10) Patent No.: US 12,783,964 B2
(45) Date of Patent: Nov. 3, 2026

(54) METHOD AND SYSTEM FOR CLASSIFYING DATASET BASED ON LICENSE RISK ANALYSIS

(71) Applicant: LG MANAGEMENT DEVELOPMENT INSTITUTE CO., LTD., Seoul (KR)

(72) Inventors: Sung Ryull Sohn, Seoul (KR); Jaekyeom Kim, Seoul (KR); Hong Lak Lee, Ann Arbor, MI (US); Jeong Won Jo, Seoul (KR); Ji Hoon Choi, Seoul (KR)

(73) Assignee: LG MANAGEMENT DEVELOPMENT INSTITUTE CO., LTD., Seoul (KR)

( * ) Notice: Subject to any disclaimer, the term of this patent is extended or adjusted under 35 U.S.C. 154(b) by 0 days.

(21) Appl. No.: 19/575,948

(22) Filed: Mar. 24, 2026

(65) Prior Publication Data

US 2026/0228311 A1 Aug. 6, 2026

Related U.S. Application Data

(63) Continuation of application No. PCT/KR2025/012377, filed on Aug. 14, 2025.

(30) Foreign Application Priority Data

Oct. 21, 2024 (KR) ........................ 10-2024-0144393
Oct. 21, 2024 (KR) ........................ 10-2024-0144405

(51) Int. Cl.
*G06F 21/10* (2013.01)
*G06F 18/2431* (2023.01)

(52) U.S. Cl.
CPC ........ *G06F 21/105* (2013.01); *G06F 18/2431* (2023.01)

(58) Field of Classification Search
CPC ........................... G06F 21/105; G06F 18/2431
See application file for complete search history.

(56) References Cited

U.S. PATENT DOCUMENTS 8,386,455 B2 2/2013 Basu et al.
9,396,280 B2 7/2016 Gu et al.
(Continued)

FOREIGN PATENT DOCUMENTS

JP 2010-9356 1/2010
JP 2024-147537 10/2024
(Continued)

OTHER PUBLICATIONS

"Clauserec: a Clause Recommendation Framework for AI-aided Contract Authoring", Vinay Aggarwal, Proceedings of the 2021 Conference on Empirical Methods in Natural Language Processing, pp. 8770-8776, Nov. 7-11, 2021 (Year: 2021).*
(Continued)

*Primary Examiner* — Duan Zhang
(74) *Attorney, Agent, or Firm* — WOMBLE BOND DICKINSON (US) LLP

(57) ABSTRACT

A method of classifying a dataset based on license risk analysis includes: identifying a context including at least one license clause for each of datasets; determining one of predefined license classification classes for each of the datasets based on the identified context using an artificial intelligence model; associating the determined classification class with an identifier of each of the datasets and storing the datasets in memory; receiving an input signal for inputting condition information including at least one target dataset or target classification class that is a target of license risk analysis; loading at least a part of data stored in the memory through the artificial intelligence model, generating at least one dataset or classification class matching the condition information as recommendation information, and storing the
(Continued)

generated recommendation information in the memory; and expressing the generated recommendation information through a user interface.

17 Claims, 9 Drawing Sheets

(56) References Cited

U.S. PATENT DOCUMENTS

| | | | |
|---|---|---|---|
| 11,379,560 B2 | 7/2022 | Gopireddy | |
| 11,487,832 B2 | 11/2022 | Bakir et al. | |
| 11,556,733 B2 | 1/2023 | Andrabi et al. | |
| 11,971,936 B2 | 4/2024 | Bakir et al. | |
| 12,314,327 B2 | 5/2025 | Andrabi et al. | |
| 2009/0319954 A1 | 12/2009 | Gu et al. | |
| 2011/0072001 A1 | 3/2011 | Basu et al. | |
| 2014/0109237 A1 | 4/2014 | Novick et al. | |
| 2020/0125891 A1 | 4/2020 | Andrabi et al. | |
| 2020/0125892 A1 | 4/2020 | Andrabi et al. | |
| 2020/0125977 A1* | 4/2020 | Andrabi | G06F 16/9035 |
| 2020/0302032 A1 | 9/2020 | Gopireddy | |
| 2020/0342039 A1 | 10/2020 | Bakir et al. | |
| 2021/0182607 A1* | 6/2021 | Agarwal | G06F 16/164 |
| 2022/0382819 A1 | 12/2022 | Raman et al. | |
| 2023/0050054 A1 | 2/2023 | Bakir et al. | |
| 2024/0176840 A1* | 5/2024 | Nagpal | G06F 16/958 |
| 2024/0232272 A1 | 7/2024 | Bakir et al. | |

FOREIGN PATENT DOCUMENTS

| | | | |
|---|---|---|---|
| KR | 10-2015-0070175 | 6/2015 | |
| KR | 10-1633525 | 6/2016 | |
| KR | 10-1727877 | 4/2017 | |
| KR | 10-2020-0119016 | 10/2020 | |
| KR | 10-2021-0141601 | 11/2021 | |
| KR | 20210141601 A * | 11/2021 | G06F 21/604 |
| KR | 10-2024-0011892 | 1/2024 | |
| KR | 10-2629022 | 1/2024 | |
| KR | 10-2643444 | 3/2024 | |

OTHER PUBLICATIONS

Rabbit: "A peek into rabbit's progress with LAM playground", Apr. 16, 2025, pp. 1-5.

Shivam Danawale, AI Researcher, et al.: "What are Large Action Models (LAM) and How They Work?", Apr. 16, 2025, pp. 1-21.

LG CNS: "Check out the latest IT news at the LG CNS's technology blog, DX Lounge", AI Industry in 2024 and its English machine translation by Google, pp. 1-18.

Office Action dated Apr. 2, 2025 for Korean Patent Application No. 10-2024-0144393 and its English translation from Global Dossier.

Notice of Allowance dated Jul. 8, 2025 for Korean Patent Application No. 10-2024-0144393 and its English translation from Global Dossier.

Weifeng Lin et al.: "Draw-and-Understand: Leveraging Visual Prompts to Enable MLLMs to Comprehend What You Want", arXiv:2403.20271v1 [cs.CV] Mar. 29, 2024, pp. 1-31.

Garima Singhal et al.: "The Large Action Model: Pioneering the Next Generation of Web and App Engagement", 2024 11th International Conference on Reliability, Infocom Technologies and Optimization (Trends and Future Directions) (ICRITO), Amity University, Noida, India, Mar. 14-15, 2024, pp. 1-6.

Office Action dated Apr. 18, 2025 for Korean Patent Application No. 10-2024-0144405 and its English translation from Google Translate.

Notice of Allowance dated Dec. 24, 2025 for Korean Patent Application No. 10-2024-0144405 and its English translation from Google Translate.

* cited by examiner

FIG. 9

| Class | Usage reference criterion | |
|---|---|---|
| A-1 | B2C | Public disclosure |
| A-2 | | Use for business purpose through AI model by third party and affiliate |
| A-3 | | Use of output indirectly for external business purpose by affiliate |
| B-1 | B2B | Providing AI model to third party for internal use |
| B-2 | | Internal use within affiliate only |
| C-1 | Internal | Disclosure of existence of model externally |
| C-2 | | Internal research only, with no disclosure of any detail to external party |

METHOD AND SYSTEM FOR CLASSIFYING DATASET BASED ON LICENSE RISK ANALYSIS

CROSS-REFERENCE TO RELATED APPLICATIONS

This application is a continuation of International Patent Application No. PCT/KR2025/012377, filed on Aug. 14, 2025, which claims the benefit of and priority to Korean Patent Application No. 10-2024-0144405, filed on Oct. 21, 2024, and Korean Patent Application No. 10-2024-0144393, filed on Oct. 21, 2024, the entire disclosures of which are hereby incorporated herein by reference in their entireties.

BACKGROUND

Technical Field

The present disclosure generally relates to a method and system for classifying a dataset based on license risk analysis. Specifically, some embodiments of the present disclosure may relate to a method and system for constructing a database by analyzing and classifying license risk for a dataset, and recommending a license classification class or a dataset for a task input by a user.

Related Art

Recently, as artificial intelligence services based on a large language model (LLM) have become widespread, a large action model (LAM), which directly operates web environments and applications by learning user behavior patterns beyond language generation and understanding, is under development.

The large action model (LAM) is a model specialized in predicting and processing user actions mainly in operation contexts. For example, when a user performs various actions such as click, selection, and drag, the model can process these actions in real time and predict a next appropriate action.

However, if a large action model (LAM) is trained using contaminated data that may cause legal issues, uncertain task performance may outcome by providing information of which copyright status is not established during task execution.

Specifically, when a large action model (LAM) trained based on contaminated data is utilized in a particular company, even if it is used only within the company's internal environment, disputes with data authors may arise due to copyright infringement under the Copyright Act, violation of the Unfair Competition Prevention Act, violation of the Personal Information Protection Act, civil and infringement of criminal liability for trade secrets, and infringement of publicity rights. Further, when a product is deployed and supplied to consumers, disputes with consumers may also arise, such as violation of the Consumer Basic Act, violation of the obligation to notify product defects, and civil liability for damages.

To this end, a data manager must individually check the license conditions of sources and sub-information included in each piece of data. However, since the amount of data is very large and the scale is continuously increasing, it may be difficult for an individual to review the licenses for all data without errors.

In particular, when attempting to select and use only safe datasets that satisfy specific license conditions (for example, only available for non-commercial use), a conventional structure system may not efficiently find necessary datasets among a large amount of data.

SUMMARY

According to some embodiments of the present disclosure, a method and system may classify a dataset based on license risk analysis that establishes a structured system capable of quantitatively evaluating license-related risks for data that is used in actions to accomplish tasks.

Further, according to certain embodiments of the present disclosure, a method and system may classify a dataset based on license risk analysis that classifies license classes of machine learning models that internally or externally exist and are used during task execution.

Additionally, according to some embodiments of the present disclosure, a method and system may classify a dataset based on license risk analysis that calculates model risk scores to determine license compliance of a plurality of models with classified license classes.

In addition, according to certain embodiments of the present disclosure, a method and system may classify a dataset based on license risk analysis that constructs a systematic database by associating a license classification class with an identifier and provides customized recommendation information in accordance with conditions desired by a user.

However, the objectives to be achieved by the present disclosure and embodiments of the present disclosure are not limited to the objectives described above and there may be other objectives.

A method of classifying a dataset based on license risk analysis according to an embodiment of the present disclosure, which is a method that is performed on a computer, includes: identifying a context including at least one license clause for each of a plurality of datasets by means of at least one processor; determining any one of a plurality of predefined license classification classes for each of the plurality of datasets on the basis of the identified context using at least one artificial intelligence model by means of the at least one processor; associating the determined classification class with an identifier of each of the datasets and storing the plurality of datasets in at least one memory by means of the at least one processor; receiving an input signal from a user by means of the at least one processor wherein the input signal is a signal for inputting condition information including at least one target dataset or target classification class that is a target of license risk analysis; loading at least a part of data stored in the at least one memory through the at least one artificial intelligence model, generating at least one dataset or classification class matching the condition information as recommendation information, and storing the generated recommendation information in the at least one memory by means of the at least one processor; and expressing the generated recommendation information through a user interface by means of the at least one processor.

Further, the identifying a context includes: searching an app or web associated with the dataset using the at least one artificial intelligence model; and detecting text data including the license clause through the searching.

Further, the searching of a web associated with the dataset includes: identifying a plurality of interaction elements in a user interface of an app or a web by means of the at least one artificial intelligence model; generating a target task for finding the license clause;

generating an execution plan including an action for at least one of the plurality of interaction elements; and controlling to perform the target task according to the generated execution plan.

Further, the determining of any one of a plurality of predefined license classification classes includes: parsing the context in accordance with a plurality of predefined license evaluation categories; and calculating a risk score on the basis of the parsing result.

Further, the license evaluation categories include authority to create derivative works of data, period and regional restrictions on data use, and a possibility of conflict between data licenses.

Further, the dataset is at least one of a source code and a dataset for machine learning.

Further, the at least one artificial intelligence model is pre-trained on the basis of a plurality of demo sets in which log data of actions performed by a user on at least one app or web and intents corresponding to the actions are matched.

Further, the demo sets further include a demo image tracing a user's cursor movement, and the at least one artificial intelligence model is configured to output location information of the interaction elements when receiving the demo image.

Further, the at least one artificial intelligence model is trained to generate, on the basis of an input signal including condition information including the target dataset or the target classification class, a guideline that explains recommendation information, which includes at least one dataset or classification class matching the condition information, in the form of natural language.

Further, the determining of any one of a plurality of predefined license classification classes includes: when the dataset is generated by at least one artificial intelligence model, calculating a model risk score on the basis of license information of data on which the model was trained; and determining a license classification class of the dataset in accordance with the calculated model risk score.

Further, the model risk score is calculated by: calculating a risk score for each of the plurality of datasets constituting training data of the model; and summing the values obtained by multiplying the calculated risk scores by a weight based on the proportion of each dataset in the training data of the model.

Meanwhile, a system for classifying a dataset based on license risk analysis according to an embodiment of the present disclosure includes: at least one memory; and at least one processor configured to execute instructions stored in the at least one memory, wherein the at least one processor operates in accordance with instructions of: identifying a context including at least one license clause for each of a plurality of datasets; determining any one of a plurality of predefined license classification classes for each of the plurality of datasets on the basis of the identified context using at least one artificial intelligence model; associating the determined classification class with an identifier of each of the datasets and storing the plurality of datasets in at least one memory; receiving an input signal from a user wherein the input signal is a signal for inputting condition information including at least one target dataset or target classification class that is a target of license risk analysis; loading at least a part of data stored in the at least one memory through the at least one artificial intelligence model, generating at least one dataset or classification class matching the condition information as recommendation information, and storing the generated recommendation information in the at least one memory; and expressing the generated recommendation information through a user interface.

Further, the at least one processor operates in accordance with instructions of searching an app or web associated with the dataset using the at least one artificial intelligence model, and of detecting text data including the license clause through the searching.

Further, the at least one processor operates in accordance with instructions of controlling the at least one artificial intelligence model to: identify a plurality of interaction elements in a user interface of an app or a web; generate a target task for finding the license clause; generate an execution plan including an action for at least one of the plurality of interaction elements; and control to perform the target task according to the generated execution plan.

Further, the at least one processor operates in accordance with instructions of: parsing the context in accordance with a plurality of predefined license evaluation categories; and determining the license classification class by calculating a risk score on the basis of the parsing result.

Further, the license evaluation categories include authority to create derivative works of data, period and regional restrictions on data use, and a possibility of conflict between data licenses.

Further, the dataset is at least one of a source code and a dataset for machine learning.

Further, the at least one artificial intelligence model is pre-trained on the basis of a plurality of demo sets in which log data of actions performed by a user on at least one app or web and intents corresponding to the actions are matched.

Further, the demo sets further include a demo image tracing a user's cursor movement, and the at least one artificial intelligence model is configured to output location information of the interaction elements when receiving the demo image.

Further, the at least one processor operates in accordance with instructions of: when the dataset is generated by at least one artificial intelligence model, calculating a model risk score on the basis of license information of data on which the model was trained; and determining a license classification class of the dataset in accordance with the calculated model risk score.

A method and system for classifying a dataset based on license risk analysis according to an embodiment of the present disclosure may construct a structured system that quantitatively evaluates risks that may arise regarding the license of data used in actions to achieve a task, thereby increasing the efficiency of resources required to verify license compliance for each piece of data, and prevent potential licensing disputes with data creators and consumers.

Further, a method and system for classifying a dataset based on license risk analysis according to an embodiment of the present disclosure may classify license classes of machine learning models internally or externally used when performing a task, thereby facilitating the understanding and management of licensing risks for a plurality of machine learning models.

Additionally, a method and system for classifying a dataset based on license risk analysis according to an embodiment of the present disclosure may calculate model risk scores to determine license compliance of a plurality of models with classified license classes, thereby providing a task performance result with improved accuracy of source using only data for which copyright usability has been established.

In addition, a method and system for classifying a dataset based on license risk analysis according to an embodiment of the present disclosure may construct a systematic database by associating a license classification class with an identifier and provide customized recommendation information in accordance with conditions desired by a user, thereby reducing time for developers and planners to make decision using datasets and contributing to the development of high-quality artificial intelligence services that comply with license regulations.

However, effects that can be obtained in the present disclosure are not limited to those stated above, and other effects not stated can be clearly understood from the following description.

BRIEF DESCRIPTION OF DRAWINGS

FIG. 9 is a table showing classification criteria of license classes according to an embodiment of the present disclosure.

DETAILED DESCRIPTION OF EMBODIMENTS

Figure 1:
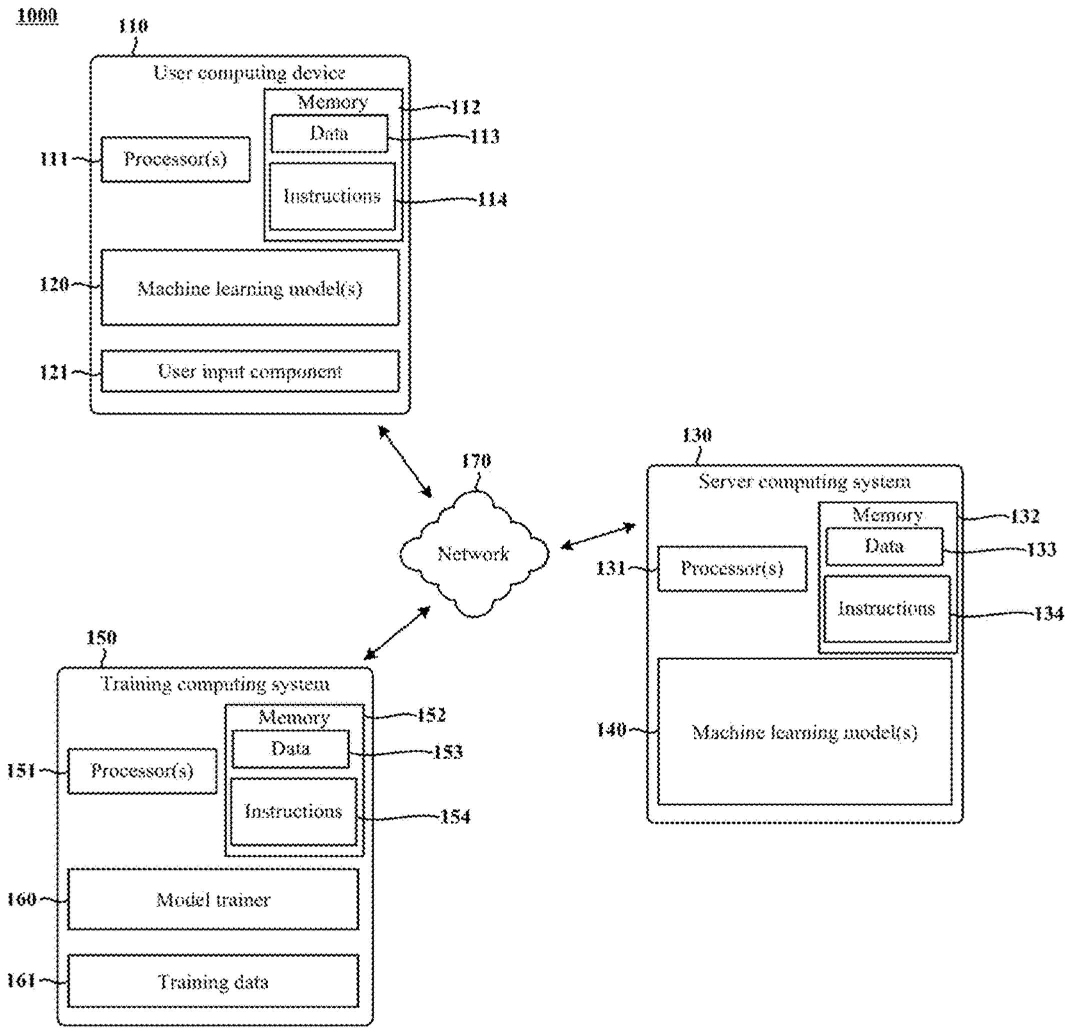
FIG. 1 illustrates a block diagram of a computing system that implements a web navigation service based on an action agent according to an embodiment of the present disclosure.

The present disclosure may be modified in various ways and may have various embodiments, so that specific embodiments are shown in the drawings and will be described in the detailed description. The advantages and features of the present disclosure, and methods of achieving them will be clear by referring to the embodiments that will be described hereafter in detail with reference to the drawings. However, the present disclosure is not limited to the disclosed embodiments and may be implemented in various ways. In the following embodiments, terms such as "first" and "second" are used to discriminate a component from another component without limiting the components. Further, singular forms are intended to include plural forms unless the context clearly indicates otherwise. Further, terms such as "include" or "have" mean that the features or components described herein exist without excluding the possibility that one or more other features or components are added. Further, components may be exaggerated or reduced in size for the convenience of description. For example, the sizes and thicknesses of the components shown the drawings are selectively provided for the convenience of description and the present disclosure is not necessarily limited thereto.

Hereinafter, embodiments of the present disclosure are described in detail with reference to the accompanying drawings, and in the following description of the accompanying drawings, like reference numerals are given to like components and repetitive description is omitted.

FIG. 1 illustrates a block diagram of a computing system that performs a web navigation providing service based on an action agent according to an embodiment of the present disclosure.

Referring to FIG. 1, a computing system or computer 1000 that performs a web navigation providing service based on an action agent according to an embodiment of the present disclosure may include a user computing device or user computer 110, a training computing system or training computer 150, and a server computing system or server 130, and one or more the devices and systems included in the computing system 1000 may be communicably connected through a network 170.

According to an embodiment of the present disclosure, (1) the user computing device 110 can perform a web navigation providing service based on an action agent using a local and/or external machine learning model 120 or using a machine learning model 140 provided by a server.

Further, according to another embodiment of the present disclosure, (2) a server computing system 130 that communicates with the user computing device 110 can provide a web navigation providing service based on an action agent to the user computing device 110 on an application and/or on the web in response to a user's request through the user computing device 110.

Further, according to still another embodiment of the present disclosure, (3) the user computing device 110 and the server computing system 130 can provide a web navigation providing service based on an action agent to a user by performing at least a part of a method of providing a web navigation providing service based on an action agent in linkage with each other.

Further, according to various embodiments of the present disclosure, the user computing device 110 and/or the server computing system 130 can train the machine learning model 120/140 that is used in the method of providing the web navigation providing service based on the action agent through interaction with the training computing system 150 communicably connected through the network 170. The training computing system 150 may be separate from the server computing system 130 or may be a part of or be included in the server computing system 130.

In some embodiments, the training computing system 150 may be a part of or included in the server computing system 130 or a part of or included in the user computing device 110.

In the following description, an exemplary embodiment of accessing the server computing system 130 through the user computing device 110, performing a web navigation providing service based on an action agent, and providing the web navigation providing service based on an action agent using a language model in the server computing system 130 itself or in a separate server is provided solely for illustration only as an example.

However, it can be understood that another exemplary embodiment in which a part of the process described as being performed by the server computing system 130 is performed by the user computing device 110 can be implemented.

User Computing Device (110)

The user computing device 110 may include, for example, but not limited to, a smart phone, a mobile phone, a digital broadcasting device, a personal digital assistant (PDA), a portable multimedia player (PMP), a desktop, a wearable device, an embedded computing device, and/or a tablet personal computer (PC), as well as any other type of computing device.

Further, in an embodiment, the user computing device 110 may include a predetermined server computing device that provides a web navigation service environment based on an action agent.

The user computing device 110 includes one or more processors 111 and memories 112.

For example, the processor 111 may comprise at least one of a central processing unit (CPU), a graphics processing unit (GPU), application-specific integrated circuits (ASICs), digital signal processors (DSPs), digital signal processing devices (DSPDs), programmable logic devices (PLDs), field programmable gate arrays (FPGAs), controllers, microcontrollers, microprocessors, and/or other electrical units for performing specific functions, or a plurality of electrically connected processors.

The memory 112 may include one or more non-transitory and/or transitory computer-readable storage media such as Random Access Memory (RAM), Read-Only Memory (ROM), Electrically Erasable Programmable Read-Only Memory (EEPROM), Erasable Programmable Read-Only Memory (EPROM), flash memory device, magnetic disk, and combinations thereof, and may include a web storage of a server performing the storing function of the memory or storage over the internet. The memory 112 can store data and instructions necessary for at least one processor 111 to perform the operation of an application for providing a web navigation providing service based on an action agent.

In an embodiment, the user computing device 110 can perform various operations of deep learning for a web navigation service based on an action agent in linkage with a deep learning neural network.

For instance, the deep learning neural network may include a convolutional neural network (CNN), R-CNN (Regions with CNN features), a Fast R-CNN, a Faster R-CNN, a Mask R-CNN, and the like, and may include any deep learning neural network which contains an algorithm capable of performing operations associated with one or more embodiments to be described below. In an embodiment of the present disclosure, the deep learning neural network itself is not limited or restricted.

In this configuration, depending on embodiments, the deep learning neural network may be directly installed on the server computing system 130, or may operate as a separate device from the server computing system 130 and perform deep learning for a web navigation service based on the action agent.

Further, in an embodiment, the user computing device 110 can store one or more machine learning models 120. For example, the user computing device 110 may include various machine learning models, such as a plurality of neural networks (e.g., deep neural networks) that performs a web navigation providing service based on an action agent on the basis of structured or quantitative data, or other types of machine learning models including a nonlinear model and/or a linear model, and may be configured by a combination thereof.

For example, linear regression, a decision tree, a random forest, gradient boosting, a pre-trained language model, and/or a deep learning model may be stored in the machine learning model. Further, the neural network may include one or more of feed-forward neural networks, recurrent neural networks (e.g., long short-term memory recurrent neural networks), convolutional neural networks, and/or other types of neural networks.

Specifically, in an embodiment, the user computing device 110 can store an actionable agent (hereinafter, an action agent (AA)) that performs actions by identifying the intent for a given task while interacting with a given environment (more specifically, a web page).

In an embodiment, the action agent (AA) may refer to a computing system or computer that autonomously performs predetermined actions such as click, selection, and drag by learning behavior patterns of a user on the basis of a large-scale action model (LAM) and predicting actions of the user when a task is given. In an embodiment, a user may refer to a person who performs input through an application or program to receive a web navigation service.

The action agent (AA) can perform a web navigation providing service on the basis of the predetermined machine learning models. For example, a machine learning model may include an intent extraction model, a guideline extraction model, and/or a license extraction model.

Further, the user computing device 110 can store models to be used in each process and prompt templates underlying input to the models in order to perform at least a portion of processes that are performed to provide a web navigation providing service based on an action agent through a large-scale language model (LLM) and/or a large-scale action model (LAM).

For example, the user computing device 110 may store: (1) a prompt for generating a query from input by a user, (2) a prompt for analyzing a domain or web page, and (3) a prompt for generating a trajectory.

That is, in an embodiment, the user computing device 110 can perform a web navigation providing service based on an action agent on the basis of data received by requesting a language model of an external server to perform at least some process steps through prompts or the like in a method of providing a web navigation service based on an action agent.

In another embodiment, a method of providing a web navigation service based on an action agent requested through the user computing device 110 may be performed in a way that the server computing system 130 provides data to the user computing device 110 by performing a web navigation providing service based on an action agent through one or more machine learning models 140 and machine learning models of other servers.

The user computing device 110 may include one or more input components 121 that detect input by a user, for instance, the input component 121 may include a sensor system including an image sensor, a position sensor (IMU), an audio sensor, a distance sensor, a proximity sensor, a touch sensor, etc.

For example, the user input component 121 may include a touch sensor (e.g., a touch screen and/or a touch pad) that detects a touch from an input medium of a user (e.g., a finger or stylus), an image sensor that detects motion input by a user, a microphone that detects voice input by a user, a button, a mouse, and/or a keyboard.

Here, the image sensor may include an image processing module. Specifically, the image sensor can process still images or videos obtained by an image sensor device (e.g., Complementary Metal-Oxide-Semiconductor (CMOS) or Charge-Coupled Device (CCD)).

Further, the image sensor can extract necessary information by processing still images or videos acquired through an image sensor device using an image recognition process (e.g., OCR), and can transmit the extracted information to a processor.

Further, the input component 121 can receive input for an external controller (for example, a mouse, a keyboard, etc.) on the basis of an interface module. In some embodiments, the input component 121 may include an external output device (for example, a speaker).

The interface module 140 may be implemented to include at least one of a wired/wireless headset port, an external charger port, a wired/wireless data port, a memory card port, a port connecting a device equipped with an identification module, an audio I/O (Input/Output) port, a video I/O (Input/Output) port, an earphone port, a power amplifier, an RF circuit, a transceiver, or other communication circuits.

Further, the external output device may include, for example, but not limited to, a display system that outputs various items of information related to a web navigation service based on an action agent in the form of graphic images.

The display system may be implemented to include, for instance, but not limited to, at least one of a liquid crystal display (LCD), a thin film transistor-liquid crystal display (TFT LCD), an organic light-emitting diode (OLED), a flexible display, a three-dimensional (3D) display, and an electronic ink (e-ink) display.

Meanwhile, the user computing device 110 including one or more components described above may perform at least a part of the functional operations that are performed by the server computing system 130 to be described below.

Server Computing System (130)

The server computing system 130 can perform a series of processes for providing a web navigation service based on an action agent.

Specifically, in an embodiment, the server computing system 130 can provide a web navigation service based on an action agent by exchanging necessary data for executing a web navigation service process based on an action agent on an external device, such as the user computer device 110, with the external device.

More specifically, in an embodiment, the server computing system 130 can provide an environment in which an application can operate on the user computing device 110.

To this end, the server computing system 130 may include an application program, data, and/or instructions for operating an application 111, and can transmit/receive various data based thereon to or from the external device.

Further, the server computing system 130 includes at least one or more processors 131 and memories 132. The processor 131 may comprise, for instance, but not limited to, at least one of a central processing unit (CPU), a graphics processing unit (GPU), application-specific integrated circuits (ASICs), digital signal processors (DSPs), digital signal processing devices (DSPDs), programmable logic devices (PLDs), field programmable gate arrays (FPGAs), controllers, microcontrollers, microprocessors, and/or other electrical units for performing specific functions, or a plurality of electrically connected processors.

The memory 132 may include one or more non-transitory and/or transitory computer-readable storage media such as RAM, ROM, EEPROM, EPROM, flash memory device, magnetic disk, and combinations thereof. The memory 132 can store prompt templates for performing tasks through a language model of the server computing system 130 and/or a language model of an external server, and data and instructions for the machine learning model 140, etc.

For example, the server computing system 130 may include a neural network or other multi-layer nonlinear models as the machine learning model 140. An exemplary neural network may include a feed-forward neural network, a deep neural network, a recurrent neural network, and a convolutional neural network.

In an embodiment, the server computing system 130 may be implemented to include at least one or more computing devices or computers. For example, the server computing system 130 may be implemented to operate a plurality of computing devices in accordance with a sequential computing architecture, a parallel computing architecture, or a combination thereof. Further, the server computing system 130 may include a plurality of computing devices connected through a network.

In an embodiment, the server computing system 130 may further include a data store computing system 1000 (hereinafter, a "data store") that is a storage for continuously storing and managing raw data (e.g., log data, demo data, etc.) underlying a method (or a service) of providing a web navigation service based on an action agent. The data store may include various types of data storage, ranging from a file system to a cloud storage.

For example, the data store may include at least one database of: a relational database that uses Structured Query Language (SQL) to define and manipulate data; a NoSQL database that is designed for flexibility and scalability and processes unstructured and semi-structured data; a data warehouse, as a system used for reporting and data analysis, which is optimized for queries and analysis by centralizing large-scale data from multiple sources; a data warehouse that stores large volumes of raw data in its native forms, including structured, semi-structured, and unstructured data; and a local storage device or Network Attached Storage (NAS) that stores data in files in a format generally accessible by a computer operating system.

Training Computing System (150)

The training computing system 150 includes one or more processors 151 and memories 152. Here, the processor 151 may include at least one of a central processing unit (CPU), a graphics processing unit (GPU), application-specific integrated circuits (ASICs), digital signal processors (DSPs), digital signal processing devices (DSPDs), programmable logic devices (PLDs), field programmable gate arrays (FPGAs), controllers, microcontrollers, microprocessors, and/or other electrical units for performing specific functions, or a plurality of electrically connected processors. Further, the memory 152 may include one or more non-transitory and/or transitory computer-readable storage media such as RAM, ROM, EEPROM, EPROM, flash memory device, magnetic disk, and combinations thereof. The memory 152 can store data and instructions necessary for the processor 151 to train a machine learning model.

For example, the training computing system 150 may include a model trainer 160 that trains a machine learning model stored in the user computing device 110 and/or the server computing system 130 using various training or learning techniques, such as backpropagation of errors.

For example, the model trainer 160 can update one or more parameters of a machine learning model for a web navigation service based on an actionable agent in a backpropagation manner on the basis of a defined loss function.

In some embodiments, performing the backpropagation of errors may include performing truncated backpropagation through time. The model trainer 160 can perform multiple regularization techniques (for example, weight decay, dropout, knowledge distillation, etc.) to enhance the generalization capability of a machine learning model that is trained.

Further, the model trainer 160 includes computer logic that is utilized to provide desired functions. The model trainer 160 may be implemented as hardware, firmware, and/or software controlling a general-purpose processor. For example, in one embodiment, the model trainer 160 includes program files stored in a storage device, which may be loaded in a memory and executed by one or more processors. In another embodiment, the model trainer 160 includes one or more sets of computer-executable instructions stored in a tangible computer-readable storage medium such as RAM, hard disk, or optical or magnetic medium.

The network 170 may include a 3rd Generation Partnership Project (3GPP) network, a Long Term Evolution (LTE) network, a World Interoperability for Microwave Access (WiMAX) network, the Internet, a Local Area Network (LAN), a Wireless Local Area Network (Wireless LAN), a Wide Area Network (WAN), a Personal Area Network (PAN), a Bluetooth network, a satellite broadcasting network, an analog broadcasting network, and/or a Digital Multimedia Broadcasting (DMB) network, but is not limited thereto.

In general, communication over the network 170 may be performed through various communication protocols (e.g., TCP/IP, HTTP, SMTP, FTP), encodings or formats (e.g., HTML, XML), and/or security schemes (e.g., VPN, secure HTTP, SSL), using any type of wired and/or wireless communication connection.

Figure 2:
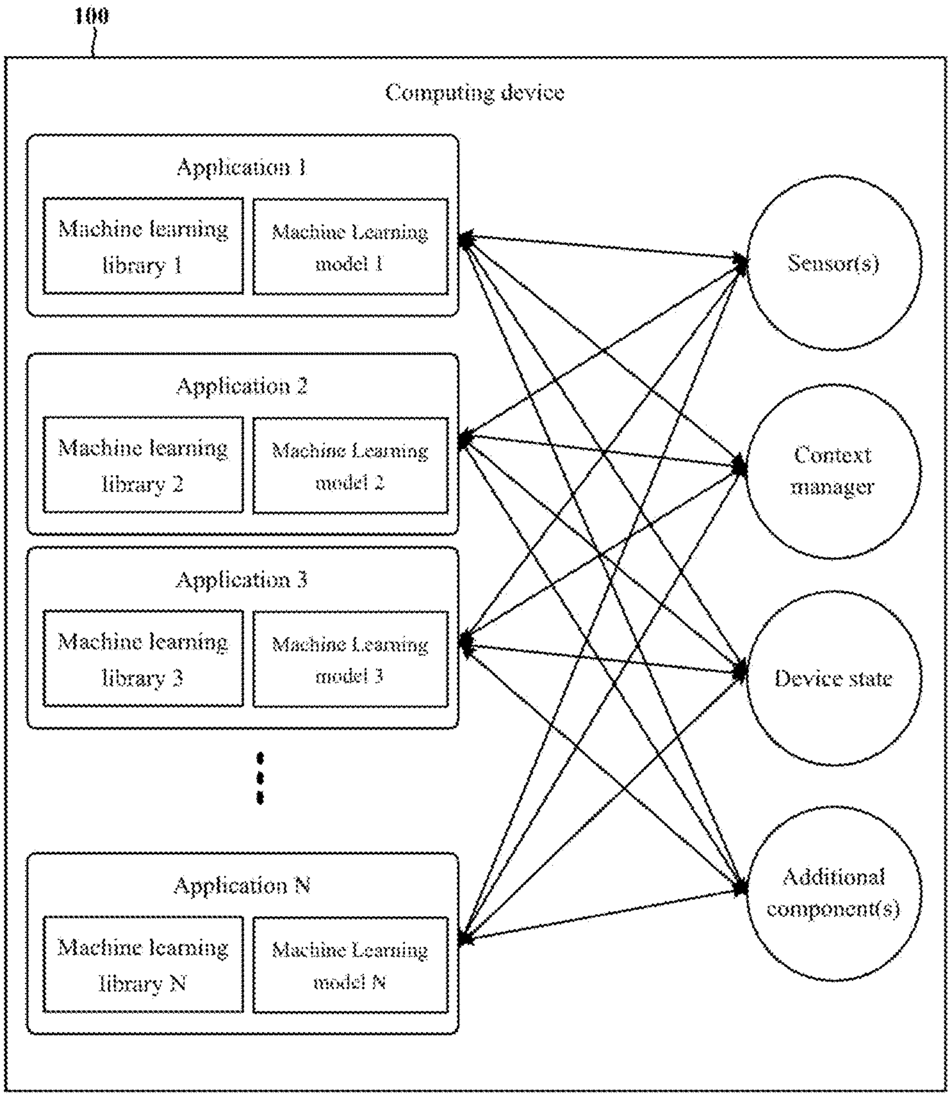
FIG. 2 illustrates a block diagram of a computing device that is one of components of a computing system that implements a web navigation service based on an action agent according to an embodiment of the present disclosure.

FIG. 2 illustrates a block diagram of a computing device that is one of components of a computing system that performs a web navigation providing service based on an action agent according to an embodiment of the present disclosure.

Referring to FIG. 2, the computing device 100 included in one or more of the user computing device 110, the server computing system 130, and the training computing system 150 includes multiple applications (for example, Application 1 to Application N). Each application may include a machine learning library.

For example, the applications may include a text messaging application, a virtual keyboard application, a browser application, a chatbot application, etc.

In an embodiment, the computing device 100 may include a model trainer 160 for training a machine learning model, and can perform a web navigation providing service based on an action agent for input data by storing and operating the machine learning model.

Each application of the computing device 100 can communicate with one or more of the plurality of other components of the computing device, such as one or more sensors, context managers, device state components, and/or additional components. In an embodiment, each application can communicate with each device component using an API (e.g., a public API). In an embodiment, the API used by each application may be specific to the corresponding application.

Figure 3:
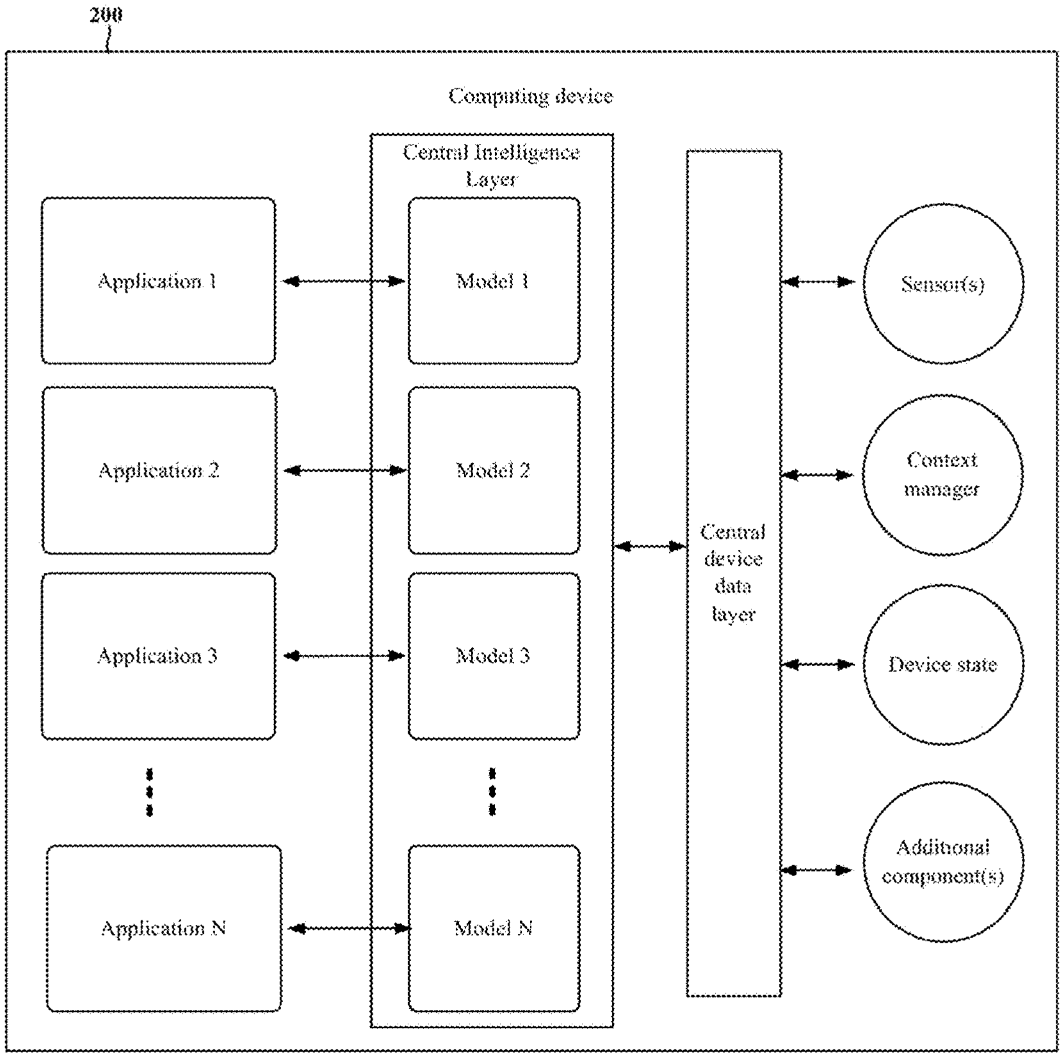
FIG. 3 illustrates a block diagram of a computing device that is one of components of a computing system that implements a web navigation service based on an action agent according to an embodiment of the present disclosure.

FIG. 3 illustrates a block diagram of a computing device that is one of components of a computing system that performs a web navigation providing service based on an action agent according to an embodiment of the present disclosure.

Referring to FIG. 3, the computing device 200 includes multiple applications (e.g., Application 1 to Application N). Each application can communicate with a central intelligence layer. For example, the applications may include a virtual keyboard application, a browser application, a chatbot application, etc. In one embodiment, each application can communicate with a central intelligence layer (and the models stored therein) using an API (e.g., a common API across all applications).

Further, the central intelligence layer may include prompts using multiple machine learning models and/or language models. For example, as shown in FIG. 3, each machine learning model, and at least some of them, may be provided for each application and may be managed by the central intelligence layer. In another embodiment, two or more applications may share a single machine learning model. For example, in some embodiments, the central intelligence layer may provide a single model for all applications. In some embodiments, the central intelligence layer may be included in the operating system of the computing device 200 or may be implemented differently.

The central intelligence layer can communicate with a central device data layer. The central device data layer may be a centralized data storage for the computing device 200. As shown in FIG. 3, the central device data layer can communicate with multiple other components of the computing device, such as one or more sensors, context managers, device state components, and/or additional components. In some embodiments, the central device data layer can communicate with each device component using an API (e.g., a private API).

The embodiments described in the present disclosure may refer not only to servers, databases, software applications, and other computer-based systems, but also to taken actions and information transmitted to or from the systems. The inherent flexibility of computer-based systems would be recognized to allow a wide range of possible configurations and combinations, division of tasks, and functionality among and from components. For example, the processes described in the present disclosure may be implemented using a single device or component, or multiple devices or components operating in combination. Databases and applications can be implemented in a single system or in a distributed system across multiple systems. Distributed components can operate sequentially or in parallel Method of Providing Web Navigation Service Based on Action Agent Hereinafter, a method in which a computing system 1000 according to an embodiment of the present disclosure provides a web navigation service based on an action agent is described in detail with reference to FIGS. 4 to 8.

In an embodiment of the present disclosure, one or more processors of the user computing device 110 can execute one or more applications and/or programs stored in one or more memories 110 or operate them in a background state.

Hereafter, it is abbreviated that the action agent performs a web navigation providing service based on the action agent described above, with one or more processors operating to execute the instructions of the applications.

The web navigation providing service according to an embodiment can be considered as a service in which, when a user requests a desired operation, action or thing on a web page, an artificial intelligence model navigates the web and determine a progress course (e.g., a sequence of clicks) for achieving the request, and performs various actions on the web page (e.g., click, search, calculation, emails, etc.) that the user would have to perform in accordance with the determined course.

Figure 4:
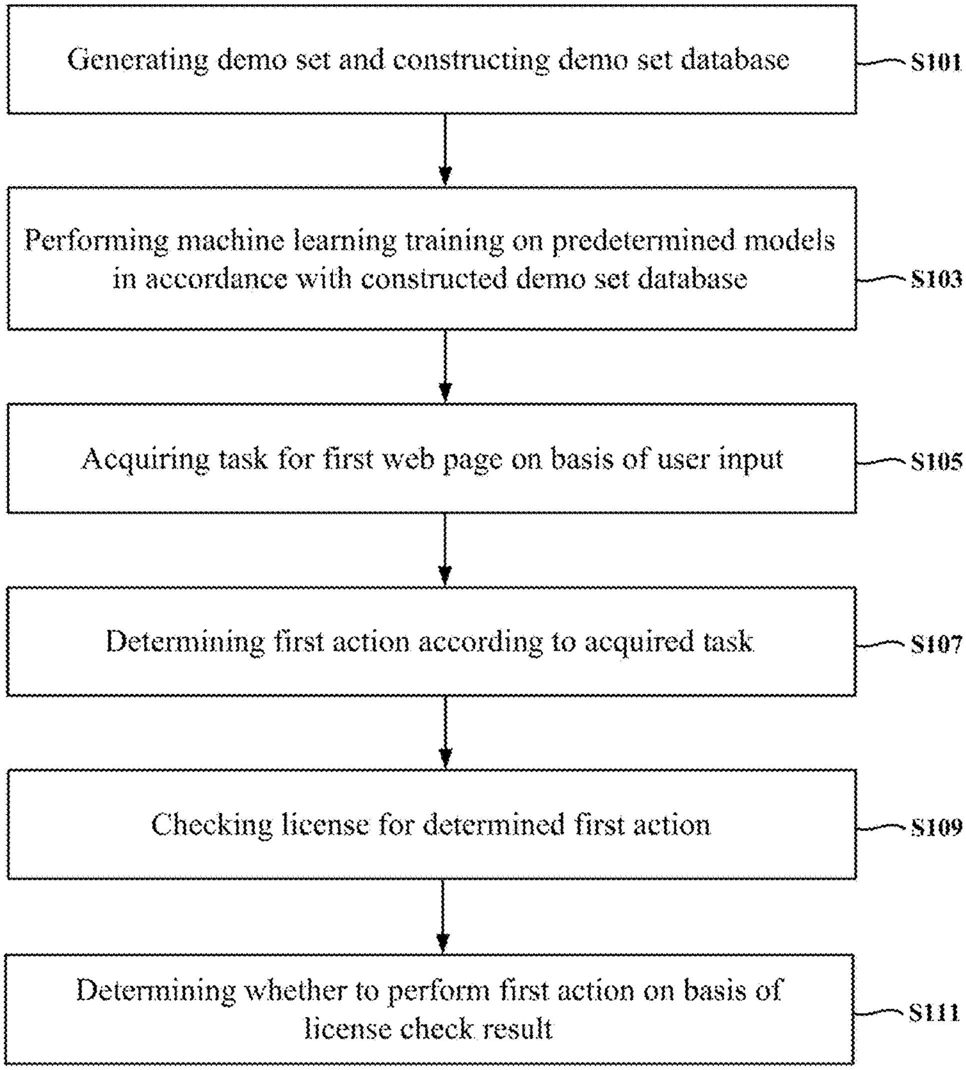
FIG. 4 is a flowchart for explaining a web navigation providing service based on an action agent according to an embodiment of the present disclosure.

FIG. 4 is a flowchart for explaining a web navigation providing service based on an action agent according to an embodiment of the present disclosure.

Referring to FIG. 4, according to an embodiment, at step S101, an action agent (AA) can generate a demonstration set (hereinafter "demo set") and construct a demo set database.

In an embodiment, the demo set may refer to a data set that stores physical actions actually performed by a user on a specific platform (e.g., a web page and/or an application) and intents and/or purposes matched with the physical actions.

Hereinafter, the physical action actually performed by a user on a specific platform may be referred to as an "action." Further, for the sake of convenience in description, a platform is described on the basis of a web page, and accordingly, the "action" may include actions, for example, click, scroll, drag, etc.

Such a demo set may be information for identifying what intent a user had and which interaction element the user interacted with on a specific web page.

That is, various types of the demo sets may be generated, depending on intents for a single web page, and may be generated for various web pages. Hereinafter, the web page included in the demo set may be referred to as a "demo page."

For example, in the case of a restaurant reservation platform, various log data may be generated in accordance with a user's intents, such as restaurant reservation, reservation change, restaurant search, and review writing.

In an embodiment, in order to generate such a demo set, the action agent (AA) can acquire log data from a first demo page.

Here, the log data may refer to all event records generated when a predetermined platform is operated, and may mean action-based data of a user.

Further, in an embodiment, the action agent (AA) can determine an intent for the acquired log data.

Here, the intent may refer to the purpose of actions performed by a user to achieve a specific task. Such an intent may be determined by being automatically extracted and determined by a predetermined machine learning model, or may be extracted and determined from a task manually input by a user. In the latter case, even the task can be matched and stored in a demo set.

In other words, when a user performs various actions on a platform to achieve a task, identifying the purpose behind each action (e.g., click, scroll, etc.) is an intent. In this case, if an assigned task is a complex multi-step task, multiple intents may be included in single log data.

Further, in an embodiment, the action agent (AA) can match the extracted intent and/or task to the acquired log data.

That is, in an embodiment, the action agent (AA) can generate and store a first demo page, log data, and an intent and/or task as a demo set by mapping them.

Figure 5:
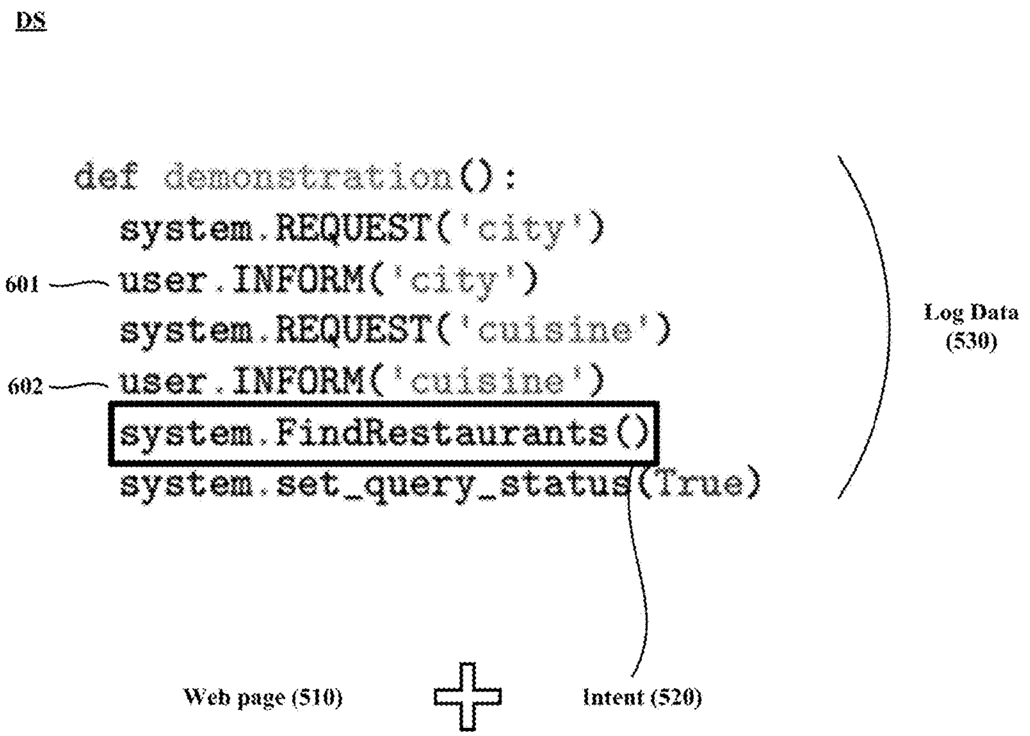
FIG. 5 is an example of a demo set according to an embodiment of the present disclosure.

FIG. 5 shows an example of a demo set according to an embodiment of the present disclosure. Specifically, a task shown in FIG. 5 is a restaurant reservation task and is part of a demo set showing requests and responses of a system and a user in text form.

Referring to FIG. 5, in an embodiment, the action agent (AA) can generate and store one demo set DS by combining a first demo page 510, a first intent 520, and/or first log data 530.

In order to generate the demo set DS, a user can interact with a system by performing predetermined actions on the first demo page 510, and complete the task upon achieving the final objective.

Further, upon completion of the task, the user can determine the first intent 520 for the performed actions.

Then, the action agent (AA) can extract the first log data 530 corresponding to the interaction with the system until the task is completed. In this case, the extracted first log data 530 may include data showing the interaction with the system until the task is completed in text form (hereinafter, a trajectory).

Next, the action agent (AA) can map the first log data 530 including the first demo page 510, the first intent 520, and a plurality of actions 601 and 602.

For example, as illustrated in FIG. 5, a first action 601 may be user input for "providing city information" and a second action 602 may be user input for "providing the type of food". Further, the first intent 520 may be a system response that "searches for a restaurant" on the basis of the city information and the type of food input by the user.

In summary, the illustrated demo set DS may mean that, when first log data 530 is generated through the user input for selecting the city information and the type of food on the first demo page 510, the plurality of actions 601 and 602 included in the first log data 530 is determined to have been performed for the first intent 520 that "searches for a restaurant".

In this manner, in an embodiment, the action agent (AA) can construct a demo set database by storing a plurality of demo sets generated for a plurality of web pages.

Construction of a demo set database according to an embodiment may be regarded as establishing a record infrastructure based on a virtual environment by individually accumulating and recording the processes of previously performed tasks for a specific web page.

Meanwhile, in an embodiment, the action agent (AA) may, when generating a demo set, match and store a video (hereinafter, a demo image) recorded by tracing the cursor of a user in relation to which interaction elements at which locations on the web page the user performed actions on.

To this end, in an embodiment, the action agent (AA) can perform prompt engineering for predetermined machine learning models that are trained through a demo set, on the basis of Set-of-Marks (SOM) prompting that highlights the interaction elements of a UI with a bounding box and/or a number.

That is, in an embodiment, the action agent (AA) can determine location information of interaction elements on a web page using an intent extraction model trained on the basis of prompt engineering and/or a demo image that shows interaction elements.

In other words, at least one machine learning model according to an embodiment may be a machine learning model trained to more accurately identify the presence and locations of interaction elements, on the basis of prompt engineering and by additionally inputting a demo image.

Further, in an embodiment, at step S103, the action agent (AA) can perform machine learning training on one or more machine learning models in accordance with a constructed demo set database.

A machine learning model according to an embodiment may include a page analysis model, an intent extraction model, a guideline extraction model, and/or a license extraction model.

The page analysis model may be a machine learning model that determines detailed information (e.g., location information and/or descriptive information) of the interaction elements included in a specific domain (e.g., a specific web page) by performing image training on the interaction elements in accordance with a demo image matched with a demo set and/or prompt engineering.

Since such a page analysis model can be integrated into and operated as an intent extraction model to be described below, it will be described below on the basis of an intent extraction model.

The intent extraction model may be a machine learning model that is trained to be specialized for a specific domain (e.g., a specific web page and/or a specific task) in accordance with an intent matched with a demo set. Such an intent extraction model may be distinguished by domain and a plurality of intent extraction models may be stored in the server computing system (130).

Figure 6:
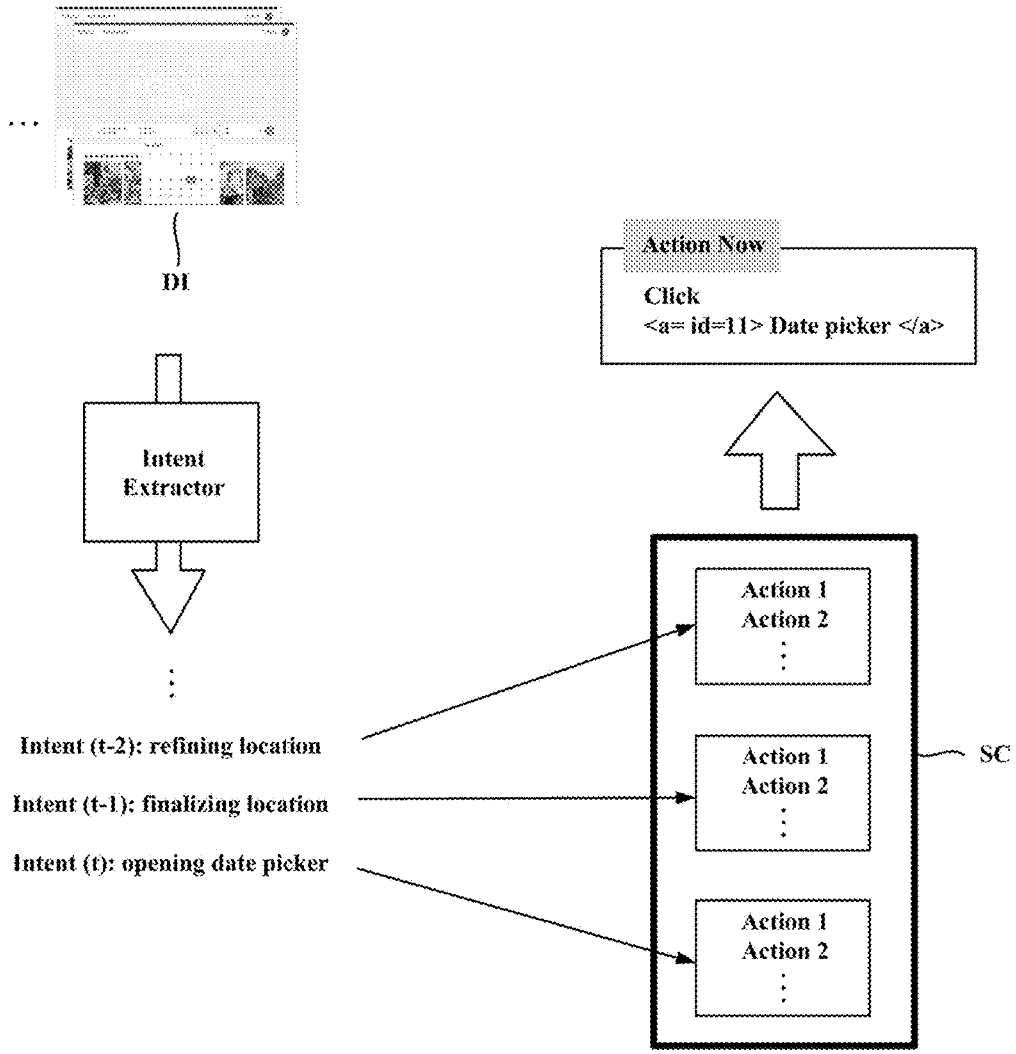
FIG. 6 shows an example of a machine learning training flow of an intent extraction model according to an embodiment of the present disclosure.

FIG. 6 shows an example of a machine learning training flow of an intent extraction model according to an embodiment of the present disclosure. In detail, FIG. 6 illustrates a part of a machine learning training flow based on a restaurant reservation task.

In an embodiment, the action agent (AA) can train an intent extraction model to output a plurality of intents included in a demo set, using the demo set as input data.

In this case, in an embodiment, the action agent (AA) can support the intent extraction model to learn the locations of interaction elements when extracting a plurality of intents by adding a demo image (DI) matched with the demo set as input data.

The demo image (DI) according to an embodiment may be an image generated by tracing actions performed by a user on a predetermined web page and showing them as predetermined visual content.

For example, in the demo image (DI), a cursor shape is shown so that the user's cursor movement is visible, and visual content (for example, a red circle) for highlighting may be shown for interaction elements with which the user has interacted (for example, physical actions on a browser such as click or drag).

By training the intent extraction model on the basis of a demo image through the action agent (AA) according to an embodiment, it is possible to easily navigate hidden menus and search tabs that are difficult to identify without user actions such as click or scroll. Accordingly, all processes included in a task proceed without interruption, so the success rate of the task increases and the number of multi-turns in which the user is asked again when interruption occurs is reduced, thereby increasing the response providing speed.

Further, in an embodiment, the action agent (AA) can train an intent extraction model to arrange a plurality of extracted intents from lower-level goals to higher-level goals using a predetermined algorithm (for example, a top-k algorithm).

The top-k algorithm is an algorithm that arranges actions predicted to be performed next by a user in order of probability and selects only the top k tokens, and, in an embodiment, the action agent (AA) can more effectively remove tokens with low probability values (in an embodiment, actions) using such a reinforcement learning algorithm described above.

Referring to FIG. 6, according to an embodiment, the action agent (AA) can train an intent extraction model to determine Intent (t) that is a high-level goal for a demo set, and sequentially determine and arrange lower-level goals toward Intent (t−1).

Further, in an embodiment, the action agent (AA) can train the intent extraction model to plan the order of actions to be performed sequentially in accordance with intents arranged from lower-level goals to higher-level goals.

In an embodiment, the action agent (AA) can, on the basis of such an intent extraction model, plan the order of actions to be performed for each goal in order to achieve the goals. That is, the action agent (AA) can predict intents and map actions to the intents.

Hereinafter, the order of actions to be performed sequentially in accordance with intents arranged from lower-level goals to higher-level goals can be referred to as a "schedule (SC)".

That is, in an embodiment, the action agent (AA) can train the intent extraction model to provide the schedule (SC) as output data when a demo set is input data. Accordingly, in an embodiment, the action agent (AA) can determine actions to be performed in accordance with the schedule (SC) output from the intent extraction model.

A guideline extraction model may be a machine learning model that is trained to provide guidelines expressed in text for the schedule (SC) determined in accordance with a task matched with a demo set.

Here, a guideline according to an embodiment may refer to information that represents a schedule determined by the intent extraction model for a demo set as concise natural language text.

For example, a first guideline may be a concise natural language text, such as "in order for a user to perform a first task on a first web page, the user performed a first action first."

In an embodiment, the action agent (AA) can train the guideline extraction model to take a demo set as input data and output a guideline for the demo set.

To this end, in an embodiment, the action agent (AA) can convert the schedule into the guideline. In this case, in an embodiment, the action agent (AA) may perform conversion using, for example, but not limited to, conjunctions and/or context, such as "when," "if," and "should", as keywords.

Further, in an embodiment, the action agent (AA) can match the extracted guideline as a label to a demo set.

That is, in an embodiment, the action agent (AA) can match the label to a demo set and store it again in a demo set database.

The guideline extraction model trained in this manner can determine a guideline most relevant to a task received from the demo set database when a web navigation service is provided, and accordingly, in an embodiment, the action agent (AA) can perform actions in accordance with the determined guideline.

Accordingly, on the basis of the guideline matched with the demo set, it is possible to identify prior knowledge regarding prerequisites during subsequent provision of the web navigation service, so there is an effect of contributing to enabling the action agent (AA) to easily plan and execute a task.

That is, in an embodiment, the action agent (AA) can provide a web navigation service that performs actions in accordance with a schedule and/or guideline based on predetermined machine learning models trained by the above-described method.

Further, in an embodiment, at step S105, the action agent (AA) can acquire a task for a first web page on the basis of user input.

In this case, a task according to an embodiment may refer to an operation that the user wants to perform on the first web page. Such a task may include a natural language text input by the user.

For example, the task may include a natural language text such as "Find a Western restaurant in the New York city for two people at 5:00 PM on March 18."

In order to receive such a task, in an embodiment, the action agent (AA) can provide a web navigation interface that interacts with the user.

In an embodiment, the web navigation interface may be provided as a chatbot-type widget for a specific web page. For example, the web navigation interface may be provided as a widget within a web page and/or as a separate individual program linked to a web page.

In an embodiment, the action agent (AA) can understand the language by performing natural language processing (e.g., parsing) on an acquired task on the basis of a predetermined natural language model.

Meanwhile, in an embodiment, the action agent (AA) may communicate with a user by providing a reverse question to the user to specify a task. In this case, if there is a certain aspect that cannot be performed in the web page where the user requested the task, the action agent (AA) may acquire predetermined data from a third-party agent by interacting with a third-party website and provide the data to the user.

Further, in an embodiment, at step S107, the action agent (AA) can determine a first action according to the acquired task.

In detail, in an embodiment, the action agent (AA) can determine a first action according to the acquired task using a predetermined machine learning model trained on the basis of a pre-constructed demo set database.

To this end, in an embodiment, the action agent (AA) can perform an action determination process to determine a first action that is the action to be performed first in accordance with the acquired task.

Figure 7:
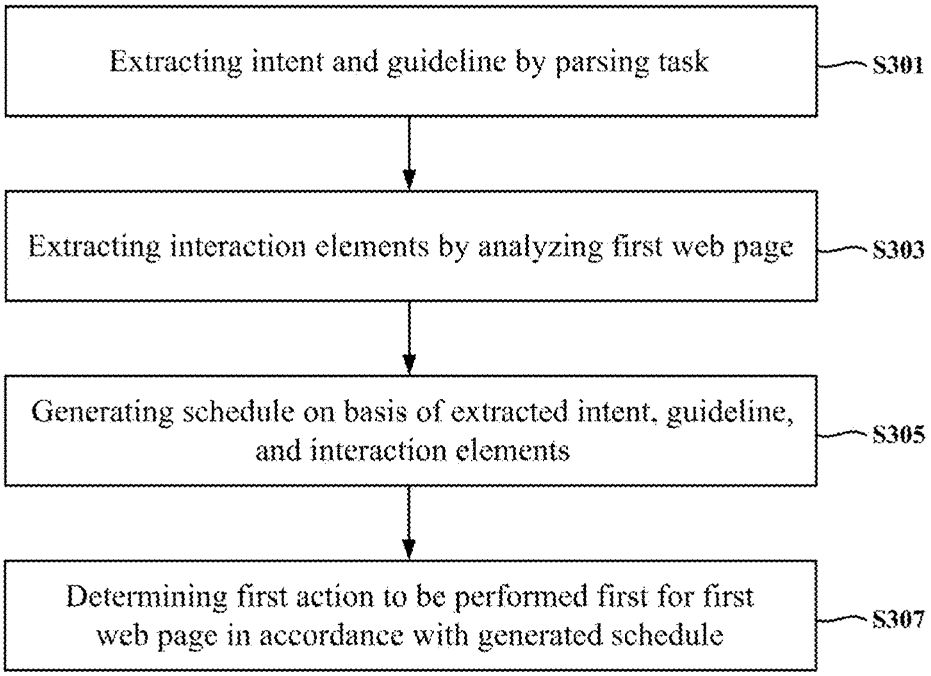
FIG. 7 is a flowchart for explaining a method for action determination according to an embodiment of the present disclosure.

FIG. 7 is a flowchart for explaining a method for action determination according to an embodiment of the present disclosure.

Referring to FIG. 7, in an embodiment, at step S301, the action agent (AA) can parse a task and extract intents and guidelines on the basis of a predetermined machine learning model (e.g., an intent extraction model and/or a guideline extraction model).

For example, the action agent (AA) can parse a task using natural language processing techniques, such as named entity recognition (NER), semantic role labeling (SRL), utterance intent classification, and/or dialogue state tracking (DST).

After analyzing the meaning of the task, the action agent (AA) in an embodiment can extract a guideline for the task on the basis of a guideline extraction model.

The guideline extraction model can extract a guideline matched to an action having the highest similarity with the acquired task in a demo set.

Further, in an embodiment, the action agent (AA) can extract one or more intents from the task on the basis of an intent extraction model.

Further, in an embodiment, the action agent (AA) can arrange at least one or more extracted intents from lower-level goals to higher-level goals.

In this case, in an embodiment, the action agent (AA), when arranging one or more intents, can change the order of a predetermined goal by reflecting the extracted guideline.

That is, in an embodiment, the action agent (AA) grasps the user's request (task) and understands the intent by extracting the intent and the guideline, thereby generating a schedule including a rough trajectory for performing actions.

Further, in an embodiment, at step S303, the action agent (AA) can extract interaction elements by analyzing a first web page.

In detail, in an embodiment, the action agent (AA) can extract interaction elements by analyzing and/or parsing the HTML structure, interaction elements (e.g., a button, an input field, etc.), layout, etc. of the first web page.

More specifically, in an embodiment, the action agent (AA) can extract interaction elements by analyzing the first web page on the basis of an intent extraction model trained on the basis of a predetermined prompt engineering method (e.g., Set-of-Marks (SOM) Prompting).

Figure 8:
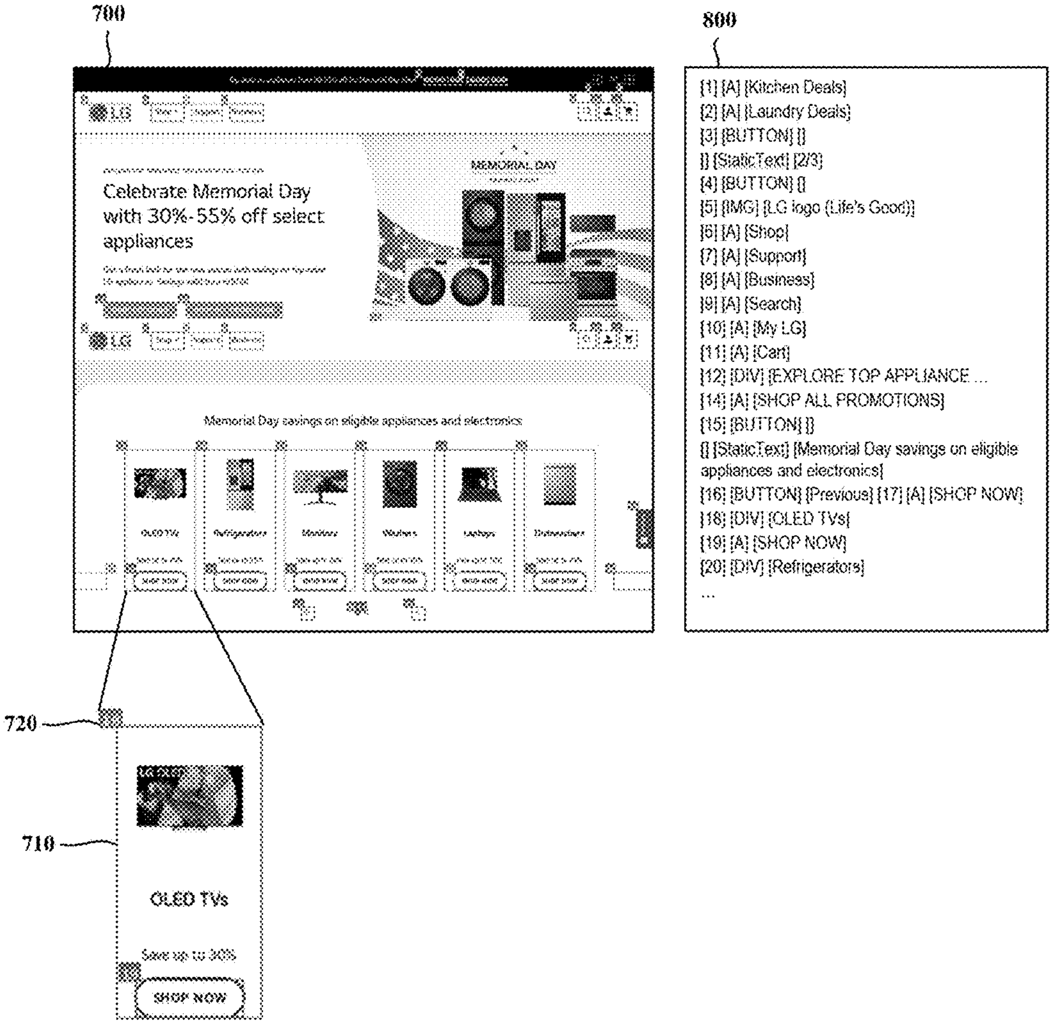
FIG. 8 is an example of interaction elements extracted by analyzing a first web page according to an embodiment of the present disclosure.

FIG. 8 is an example of interaction elements extracted by analyzing a first web page according to an embodiment of the present disclosure.

Referring to FIG. 8, in an embodiment, the action agent (AA) can extract interaction elements included in a screenshot 700 capturing a first web page on the basis of an intent extraction model.

Further, in an embodiment, the action agent (AA) can show a bounding box 710 that highlights the location of an interaction element among the plurality extracted interaction elements. Further, each bounding box 710 can be assigned and shown with a box number 720.

Further, a text script 800 that describes in text what interaction element assigned with the box number 720 is can be generated and provided.

By visualizing the structure of a web page and interaction elements, an intent extraction model can make more accurate and rapid determinations regarding the interaction elements included or present in the web page when tracking trajectories through a demo image.

In other words, in an embodiment, the action agent (AA) can define and provide the extracted interaction elements as a text script 800.

Further, in an embodiment, at step S305, the action agent (AA) can generate a schedule on the basis of the extracted intents, guidelines, and/or interaction elements.

To this end, in an embodiment, the action agent (AA) can determine detailed information for a plurality of extracted interaction elements (e.g., location information and/or descriptive information).

The detailed information for the interaction elements may be determined on the basis of a demo image (DI) and/or the text script 800.

In an embodiment, the action agent (AA) can generate a schedule on the basis of the detailed information determined for the interaction elements.

Specifically, for a schedule expressed only in a general manner, it is possible to specify a previously generated schedule for the web page by determining what content is shown for the interaction elements and where the interaction elements are located on the basis of the detailed information of the interaction elements.

Further, in an embodiment, the action agent (AA) can arrange a plurality of intents extracted from the first web page in order from lower-level-goals to higher-level goals.

When the action agent (AA) arranges actions to be performed in order from lower-level goals to higher-level goals, the primary established action plan can be reflected.

Further, in an embodiment, the action agent (AA) can generate a schedule by reflecting the extracted interaction elements into the plurality of arranged intents.

In this case, the action agent (AA) can, on the basis of a predetermined deep learning model (e.g., zero-shot learning), generate a schedule for the first web page even when a demo set for the first web page does not exist in a demo set database.

In this manner, in an embodiment, at step S307, the action agent (AA) can determine a first action to be performed first on the first web page in accordance with the generated schedule.

For example, the first action may be input and determined in the form of an anchor tag defining a link in the HTML of the first web page, such as "CLICK <a id=11> Salary <a/>," and accordingly, the action agent (AA) can click the text "Salary."

In this manner, in an embodiment, the action agent (AA) can determine a second action to an n-th action that are performed immediately after the first action included in the schedule.

In an embodiment, the action agent (AA) may stop determination and execution of actions and provide a reverse question to the user when task specification is required while determining at least one or more actions.

Referring back to this, in an embodiment, the action agent (AA) can check the license for the determined first action.

Hereinafter, an operation that the action agent (AA) checks a license and provides a copyright-dispute-prevented web navigation service is abbreviated and described as being performed by a license agent (LA). The license agent (LA) according to an embodiment refers to an action agent (AA) that checks a license and provides a copyright-dispute-prevented web navigation service.

In an embodiment, the license agent (LA) can check a license for the first action on the basis of a pre-trained license extraction model.

The license extraction model may be a machine learning model that is trained to determine the license compliance of a plurality of actions included in a trajectory (and/or schedule) matched to a demo set. That is, the license extraction model can perform one or more operations for ensuring compliance with the conditions of a license in accordance with the rules and restrictions of a dataset that is utilized by the action agent (AA) when the action agent (AA) performs a task.

In this case, a plurality of actions that are subject to license compliance determination may be actions that are performed using a first web page requested by a user for a task, or a third-party agent and/or a third-party web page other than the first web page. For example, the actions may include a search action through a third-party website or an action of downloading an attachment through the search.

In an embodiment, the license agent (LA) can train a license extraction model to receive at least one action included in a demo set as input data and to output license compliance (e.g., license information) for the input action as output data.

The license extraction model according to an embodiment can extract license information of one or more actions included in a trajectory of an input demo set and/or in sub-data constituting the demo set.

To this end, the license extraction model can perform license-related searching to extract license information in linkage with a third-party agent and/or a third-party web page (e.g., Google, arXiv, etc.).

The license information according to an embodiment may refer to information regarding the permission to access and use data included in a web page, a domain, a file, etc. through actions that are performed to accomplish a task.

In an embodiment, the license information may include information defined for a plurality of items classified into first to fourth categories.

For example, the first category may be a data license category, and a first item included in the first category may be permission to modify data and create derivative works, a second item may be the possibility of infringing the copyright of an output, a third item may be whether rights are granted for a prompt and the output, and a fourth item may be the existence of an obligation to provide data notices.

The second category may be a personal information and data security category, and a first item included in the second category may be permission to modify data and create derivative works, a second item may be the possibility of infringing the copyright of an output, a third item may be whether rights are granted for a prompt and the output, a fourth item may be the existence of an obligation to provide personal data notices, and a fifth item may be the existence of an obligation to provide security data notices.

The third category may be a data usage period and region category, and a first item included in the third category may be a restriction on a data usage period, a second item may be the possibility of revoking a data license grant, a third item may be a restriction on an AI model service period, and a fourth item may be a restriction on a data usage region.

The fourth category may be a legal risk category, and a first item included in the fourth category may be legality of a data collection process, a second item may be conflict between data licenses, a third item may be known disputes regarding AI models utilizing data, and a fourth item may be the existence of a risk in license agreement.

That is, the license extraction model can extract license information matching the first action by performing searching for each item of the first to fourth categories with respect to a first action.

The extracted license information may include a "risk score" that is a value calculated through Equation 1 below.

$$\begin{aligned} R_1 = {} & 0.1R_{1-2} + 0.15R_{1-3} + 0.05R_{1-4} + 0.03R_{1-5} + \\ & 0.07R_{2-1} + 0.03R_{2-2} + 0.05R_{2-3} + 0.04R_{2-4} + \\ & 0.09R_{3-1} + 0.03R_{3-2} + 0.03R_{3-3} + 0.05R_{3-4} + \\ & 0.02R_{3-5} + 0.06R_{4-1} + 0.05R_{4-2} + 0.1R_{4-3} + 0.05R_{4-4} \end{aligned} \quad \text{[Equation 1]}$$

In Equation 1, in the subscript of R, the number at the first position may indicate a category number and the number at the second position may indicate an item number.

In an embodiment, the license extraction model can input values into Equation 1 in accordance with the search result of each item included in each category.

The value input for each item may be, for example, a value assigned in accordance with a preset condition, or a value of 0 or 1 assigned depending on a status indicating Yes or No.

In this manner, the license extraction model can ultimately calculate a risk score for the first action through Equation 1 by inputting a value for each item included in each category.

The license extraction model can determine license compliance of the first action on the basis of the risk score calculated for the first action.

Specifically, the operation of determining license compliance may include an action which can be determined to have a usable license only when a calculated risk score satisfies a preset condition. On the other hand, if an action does not satisfy a preset condition, the corresponding action may be determined to have an unusable license.

For convenience of description, the license compliance that is determined is explained on the basis that it is dichotomously classified and determined as a usable license and/or an unusable license.

In this case, the preset condition may be set for the risk score of each item or for the overall risk score calculated through Equation 1.

For example, if the item "permission to modify data" of the "data license category" has a score of 0, the action may be determined to have an unusable license in accordance with the preset condition for the item, regardless of the scores of other items.

That is, in an embodiment, the license extraction model can provide output data by receiving at least one action included in a demo set as input data and outputting license information for the input action as a usable license and/or an unusable license.

In this manner, in an embodiment, the license agent (LA) can check the license for the first action on the basis of the license information output by the license extraction model.

Accordingly, the license agent (LA) according to an embodiment of the present disclosure may calculate risk scores for a plurality of actions on the basis of a license extraction model, thereby improving convenience in risk management by constructing a structured system that can quantitatively evaluates risks, which may arise in various aspects in relation to the license of data, in consideration of all of various risk factors.

Further, in another embodiment, the license extraction model may determine the license information of the first action as a usable license or an unusable license by analyzing the legal relationships of the terms included in one or more actions.

That is, the license extraction model can determine the license information of the first action as a usable license or an unusable license and provide the determined license information of the first action as output data.

Accordingly, in an embodiment, the license agent (LA) can check the license for the first action on the basis of the license extraction model, which uses the first action as input data and provides the license information for the first action as output data.

That is, in an embodiment, the action agent (AA) constructs a data platform that determines license compliance on the basis of a license extraction model, thereby enhancing service quality by providing a web navigation service free from potential license issues even on the basis of large-scale data.

Further, in an embodiment, at step S111, the action agent (AA) can determine whether to perform the first action in accordance with the result of the operation of license check.

In an embodiment, the action agent (AA) can perform the first action if the license information for the first action output from the license extraction model is a usable license.

However, if the license information for the first action is an unusable license, the action agent (AA) can search for another platform for performing the first action or inform the user that the first action cannot be performed and provide a reverse question to perform another action.

In this manner, in an embodiment, the action agent (AA) can check the license for each individual action included in a schedule generated to perform a task input by a user, and perform the task by sequentially executing all actions included in the schedule if it is determined that all of the actions have a usable license, whereby it can perform the task.

Meanwhile, in an embodiment, the license agent (LA) can extract risk scores for one or more models utilized while performing a certain action included in a task.

The model may include a license extraction model on which the license agent (LA) is based. This is for managing the license-related risks of data utilized by not only a license extraction model, but predetermined models (hereinafter, third models) that are used to interact with a third-party website when performing a task.

To this end, in an embodiment, the license agent (LA) can classify license classes for one or more models utilized when performing a task.

In this case, the classification criteria for the license classes may be set on the basis of the license information searched when a license is checked.

FIG. 9 is a table showing classification criteria of license classes according to an embodiment of the present disclosure.

Referring to FIG. 9, in an embodiment, the license agent (LA) can classify a first model into first to seventh classes. The definition and number of the classified classes according to the present disclosure are not limited to those shown in FIG. 9.

In an embodiment, the license agent (LA) can determine the number of data and/or the scope of disclosure of a corresponding model on the basis of classified license classes.

Accordingly, in an embodiment, the license agent (LA) can match the classified license classes, and the determined number of data and/or scope of disclosure of the corresponding model with the corresponding model, and store them.

Further, in an embodiment, the license agent (LA) can extract a model risk score for each model, for which the license classes are classified, through Equations 2 and 3 below.

$$W_i = \frac{T_i}{T_{total}} \quad \text{[Equation 2]}$$

where $W_i$ represents the weight of the i-th data, $T_i$ represents the number of tokens and/or time of the i-th data, and $T_{total}$ represents the total number of tokens and/or time of a license extraction model.

That is, in an embodiment, the license agent (LA) can calculate the ratio of the i-th dataset in a corresponding model, and acquire the weight ($W_i$) by dividing the ratio by the number of tokens and/or time of the corresponding dataset. This weight may be a value that reflects the importance of a specific dataset.

$$MR = \sum_{i=1}^{n} R_i W_i \quad \text{[Equation 3]}$$

where MR represents a model risk score, $R_i$ represents the risk score of the i-th data, and n represents the number of data reflected in accordance with license classification criteria.

In an embodiment, the license agent (LA) can acquire a model risk score by summing the products of the risk for each dataset and/or the weight of the corresponding dataset.

Such a model risk score varies depending on the type of dataset and/or license information, and can reflect the influence that each dataset has on the model risk score.

Further, in an embodiment, the license agent (LA) can determine license compliance for a model on the basis of the acquired model risk score. To this end, a predetermined preset reference condition (e.g. a preset value) may be used to determine license compliance on the basis of a model risk score.

As described above with respect to the method of calculating a risk score for an action, the determination of license compliance may comprise determining whether a model has a usable license or an unusable license.

That is, in an embodiment, the license agent (LA) can determine a usable license only when a model risk score satisfies a predetermined condition. However, if the predetermined condition is not satisfied, the model can be determined to have an unusable license, and therefore restrictions may be imposed on its use.

For example, the license agent (LA) can filter out only the data to be used in a web navigation service by setting or releasing the usability of an internal model (e.g., a license extraction model) and/or an external model utilized by the internal model.

Therefore, in an embodiment, the license agent (LA) can acquire model risk scores of a license extraction model and/or one or more third models, perform actions for a task using only models with usable licenses on the basis of the acquired model risk scores, and provide the result of the performed actions.

Accordingly, since the license agent (LA) according to an embodiment of the present disclosure can easily manage license information for a plurality of models existing internally and/or externally that are used when performing a task by calculating model risk scores, a task is performed with a dataset that prevents the possibility of copyright and/or license disputes, thereby increasing temporal/economic efficiency in data management.

In a method according to an embodiment of the present disclosure, at least one processor can provide various services using a method of classifying a dataset based on license risk analysis.

At least one processor according to an embodiment of the present disclosure can construct a database for copyright and license risk analysis. To this end, the processor can collect a plurality of datasets including a source code and/or a dataset for machine learning. For instance, the datasets stored in the database can be collected automatically or manually through crawling, APIs, RSS, streaming data, etc.

Further, the processor can identify context (e.g., text data) including at least one license clause such as license policies and terms of use in each dataset. The operation of identifying the context can be performed by automatically exploring an application or web page associated with a dataset using an artificial intelligence model.

For example, at least one artificial intelligence model identifies a plurality of interaction elements, such as a button and a link, included, shown or present in the user interface of a web page, generates a target task for finding license information, and performs an execution plan including actions on specific interaction elements, thereby being capable of detecting text data containing license clauses.

When the context is identified, the processor can determine one of a plurality of predefined license classification classes for each dataset using an artificial intelligence model. This determination operation may include parsing in accordance with the plurality of license evaluation categories and calculating a risk score on the basis of the parsing result. For instance, when an analysis target dataset has been generated by another artificial intelligence model, the processor can determine the license classification class of the dataset by calculating a model risk score on the basis of the license information of the data learned by the another artificial intelligence model.

The model risk score can be calculated by calculating a risk score for each of a plurality of datasets constituting the training data of the generating model and summing the values obtained by multiplying the risk scores by a weight based on the proportion of each dataset in the entire training data. When the operation of the analysis is completed, at least one processor can associate the determined classification class with a unique identifier of the corresponding dataset and store it in a memory in the form of a database.

When a database construction is completed, a system according to an embodiment of the present disclosure can provide customized license information in response to user queries. For instance, a processor can receive an input signal including condition information that includes at least one of: 1) a target dataset that is the target of license risk analysis and/or 2) a target classification class for searching datasets of a predetermined or higher classification class from a user.

When receiving the input signal, the processor can load a part or all of the database stored in the memory through an artificial intelligence model, search for information matching the condition information input by the user, and generate the searched information as recommendation information. For example, when the user inputs a target dataset, the license classification class of the dataset can be generated as recommendation information, or when a target classification class is input, a list of datasets included in or belonging to the class can be generated as recommendation information.

The artificial intelligence model can support the user's understanding by generating guidelines explaining the generated recommendation information in the form of natural language, and the generated recommendation information can be stored back in the memory. The processor can enable a user to intuitively check complex license information and utilize a safer dataset by displaying the generated recommendation information through a user interface.

The artificial intelligence models utilized in the various stages according to some embodiments of the present disclosure may be pre-trained on the basis of a plurality of demo sets in which the log data of user actions performed on a specific web or application are matched with the intents of the actions. If the demonstration sets further include a demonstration image tracing the user's cursor movement, the artificial intelligence models are configured to receive the image and accurately output the location information of interaction elements in the web page, thereby improving the accuracy of license information search.

Thus, a method and system for classifying a dataset based on license risk analysis according to an embodiment of the present disclosure may constructs a structured system that quantitatively evaluates risks that may arise regarding the license of data used in actions to achieve a task, thereby having an effect of increasing the efficiency of resources required to verify license compliance for each piece of data, and prevent potential licensing disputes with data creators and consumers.

Further, a method and system for classifying a dataset based on license risk analysis according to an embodiment of the present disclosure may classify license classes of machine learning models internally or externally used when performing a task, thereby facilitating the understanding and management of licensing risks for a plurality of machine learning models.

Additionally, a method and system for classifying a dataset based on license risk analysis according to an embodiment of the present disclosure may calculate model risk scores to determine license compliance of a plurality of models with classified license classes, thereby providing a task performance result with improved accuracy of source using only data for which copyright usability has been established.

In addition, a method and system for classifying a dataset based on license risk analysis according to an embodiment of the present disclosure may construct a systematic database by associating a license classification class with an identifier and provide customized recommendation information in accordance with conditions desired by a user, thereby reducing time for developers and planners to make decision using datasets and contributing to the development of high-quality artificial intelligence services that comply with license regulations.

Embodiments of the present disclosure described above may be implemented in the type of program instructions that can be executed through various computer components, and may be recorded on a computer-readable recording medium. The computer-readable recording medium may include program instructions, data files, and data structures individually or in combinations thereof. The program instructions that are recorded on a computer-readable recording medium may be those specifically designed and configured for the present disclosure or may be those available and known to those engaged in computer software in the art. The computer-readable recording medium includes magnetic media such as hard disks, floppy disks, and magnetic media such as a magnetic tape, optical media such as CD-ROMs and DVDs, magneto-optical media such as floptical disks, and hardware devices specifically configured to store and execute program instructions, such as ROM, RAM, and flash memory. The program instructions include not only machine language codes made by a compiler, but also high-level language codes that can be executed by a computer using an interpreter, etc. A hardware device may be changed into one or more software modules to perform the processes according to the present disclosure, and vice versa.

Specific embodiments described herein are exemplary embodiments and do not limit the scope of the present disclosure in any way. For briefness of the specification, electronic components, control systems, and software of the related art, and other functional aspects of the system may not be described. Furthermore, wire connection and connecting members between components shown in the figures exemplarily represent functional connections and/or physical or circuit connections, and in actual devices, they may be replaced or may be shown as various additional functional connections, physical connections, or circuit connections. Further, unless stated in detail such as "necessary" and "important", they may not be necessary component for applying the present disclosure.

Although exemplary embodiments of the present disclosure were described above, it should be understood that the present disclosure may be changed and modified in various ways by those skilled in the art without departing from the spirit and scope of the present disclosure described in the following claims. Therefore, the technical scope of the present disclosure is not limited to those described in the detailed description of the specification, and should be determined by claims.

What is claimed is:

1. A computerized method comprising:

identifying, by at least one processor, a context including at least one license clause for each of a plurality of datasets;

determining, by the at least one processor, one license classification class of a plurality of predefined license classification classes for each of the plurality of datasets based on the identified context using at least one artificial intelligence model;

associating, by the at least one processor, the determined one license classification class with an identifier of each of the plurality of datasets and storing the plurality of datasets in at least one memory;

receiving, by the at least one processor, an input signal for inputting condition information including at least one target dataset or target classification class that is a target of license risk analysis;

loading, by the at least one processor, at least a part of the plurality of datasets stored in the at least one memory through the at least one artificial intelligence model, generating at least one dataset or classification class matching the condition information as recommendation information, and storing the generated recommendation information in the at least one memory; and outputting, by the at least one processor, the generated recommendation information through a user interface, wherein the determining of the one license classification class includes: when the at least one dataset is generated by the at least one artificial intelligence model, calculating a model risk score based on license information of data on which the at least one artificial intelligence model was trained; and determining the one license classification class for each of the plurality of datasets according to the calculated model risk score, and wherein the model risk score is calculated by: calculating risk scores for the plurality of datasets constituting training data of the at least one artificial intelligence model; and summing values calculated by multiplying the calculated risk scores by a weight based on proportion of each of the plurality of datasets in the training data of the at least one artificial intelligence model.

2. The computerized method of claim 1, wherein the identifying of the context includes: searching an application or web associated with each of the plurality of datasets using the at least one artificial intelligence model; and detecting text data including the at least one license clause through the searching of the application or web.

3. The computerized method of claim 2, wherein the searching of the application or web associated with each of the plurality of datasets includes: identifying a plurality of interaction elements included in a user interface of the application or web by the at least one artificial intelligence model; generating a target task for finding the at least one license clause; generating an execution plan including an action for at least one of the plurality of interaction elements; and controlling to perform the target task according to the generated execution plan.

4. The computerized method of claim 1, wherein the determining of the one license classification class includes: parsing the context in accordance with a plurality of predefined license evaluation categories; and calculating a risk score based on the parsing of the context to determine the one license classification class.

5. The computerized method of claim 4, wherein at least one of the plurality of predefined license evaluation categories includes authority to create derivative works of data, period and regional restrictions on data use, and a possibility of conflict between data licenses.

6. The computerized method of claim 1, wherein at least one of the plurality of datasets includes at least one of a source code or a dataset for machine learning.

7. The computerized method of claim 1, wherein the at least one artificial intelligence model is pre-trained based on a plurality of demonstration sets in which log data of an action performed by a user on at least one application or web and an intent corresponding to the action performed by the user on the at least one application or web are matched.

8. The computerized method of claim 7, wherein the plurality of demonstration sets include a demonstration image tracing cursor movement caused by user input, and the at least one artificial intelligence model is configured to, in response to receipt of the demonstration image, output information about locations of a plurality of interaction elements included in a user interface of the at least one application or web.

9. The computerized method of claim 1, wherein the at least one artificial intelligence model is trained to generate, based on the input signal including the condition information including the at least one target dataset or target classification class, a guideline that explains the recommendation information, which includes the at least one dataset or classification class matching the condition information, in a form of natural language.

10. A system comprising:

memory configured to store instructions that are executable; and at least one processor configured to execute one or more of the instructions to perform operations comprising:

identifying a context including at least one license clause for each of a plurality of datasets;

determining one license classification class of a plurality of predefined license classification classes for each of the plurality of datasets based on the identified context using at least one artificial intelligence model;

associating the determined one license classification class with an identifier of each of the plurality of datasets and storing the plurality of datasets in at least one memory; receiving an input signal for inputting condition information including at least one target dataset or target classification class that is a target of license risk analysis;

loading at least a part of the plurality of datasets stored in the at least one memory through the at least one artificial intelligence model, generating at least one dataset or classification class matching the condition information as recommendation information, and storing the generated recommendation information in the at least one memory; and outputting the generated recommendation information through a user interface, wherein the determining of the one license classification class includes: when the at least one dataset is generated by the at least one artificial intelligence model, calculating a model risk score based on license information of data on which the at least one artificial intelligence model was trained; and determining the one license classification class for each of the plurality of datasets according to the calculated model risk score, and wherein the model risk score is calculated by: calculating risk scores for the plurality of datasets constituting training data of the at least one artificial intelligence model; and summing values calculated by multiplying the calculated risk scores by a weight based on proportion of each of the plurality of datasets in the training data of the at least one artificial intelligence model.

11. The system of claim 10, wherein the identifying of the context includes: searching an application or web associated with each of the plurality of datasets using the at least one artificial intelligence model, and detecting text data including the at least one license clause through the searching of the application or web.

12. The system of claim 11, wherein the searching of the application or web associated with each of the plurality of datasets includes: identifying a plurality of interaction elements included in a user interface of the application or web; generating a target task for finding the at least one license clause; generating an execution plan including an action for at least one of the plurality of interaction elements; and controlling to perform the target task according to the generated execution plan.

13. The system of claim 11, wherein the at least one artificial intelligence model is pre-trained based on a plurality of demonstration sets in which log data of an action performed by a user on at least one application or web and an intent corresponding to the action performed by the user on the at least one application or web are matched.

14. The system of claim 13, wherein the plurality of demonstration sets include a demonstration image tracing cursor movement caused by user input, and the at least one artificial intelligence model is configured to, in response to receipt of the demonstration image, output information about locations of a plurality of interaction elements included in a user interface of the at least one application or web.

15. The system of claim 10, wherein the determining of the one license classification class includes: parsing the context in accordance with a plurality of predefined license evaluation categories; and calculating a risk score based on the parsing of the context to determine the one license classification class.

16. The system of claim 15, wherein at least one of the plurality of predefined license evaluation categories includes authority to create derivative works of data, period and regional restrictions on data use, and a possibility of conflict between data licenses.

17. The system of claim 10, wherein at least one of the plurality of datasets includes at least one of a source code or a dataset for machine learning.

* * * * *